United States Patent
Chapman

(10) Patent No.: US 9,881,271 B2
(45) Date of Patent: *Jan. 30, 2018

(54) SOFTWARE SERVICE TO FACILITATE ORGANIZATIONAL TESTING OF EMPLOYEES TO DETERMINE THEIR POTENTIAL SUSCEPTIBILITY TO PHISHING SCAMS

(71) Applicant: Mark T. Chapman, Muskego, WI (US)

(72) Inventor: Mark T. Chapman, Muskego, WI (US)

(73) Assignee: Phishline, LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,085

(22) Filed: Nov. 18, 2015

(65) Prior Publication Data

US 2016/0078377 A1    Mar. 17, 2016

Related U.S. Application Data

(63) Continuation of application No. 13/934,850, filed on Jul. 3, 2013, now Pat. No. 9,224,117, which is a (Continued)

(51) Int. Cl.
G06F 11/00 (2006.01)
G06Q 10/06 (2012.01)
(Continued)

(52) U.S. Cl.
CPC ....... G06Q 10/0635 (2013.01); G06Q 10/107 (2013.01); H04L 63/1483 (2013.01); H04L 63/1433 (2013.01)

(58) Field of Classification Search
CPC .............. G06Q 10/0635; G06Q 10/107; H04L 63/1483
See application file for complete search history.

(56) References Cited

U.S. PATENT DOCUMENTS 5,892,903 A    4/1999   Klaus
6,954,858 B1   10/2005  Welborn et al.
(Continued)

OTHER PUBLICATIONS

S. Sheng; M. Holbrook, P. Kumaraguru; L. Cranor; J. Downs. "Who Falls for Phish? A Demographic Analysis of Phishing Susceptibility and Effectiveness of Interventions." CHI 2010, Apr. 10-15, 2010, Atlanta, GA, USA.

(Continued)

*Primary Examiner* — Techane Gergiso
(74) *Attorney, Agent, or Firm* — Reinhart Boerner Van Deuren P.C.

(57) ABSTRACT

A software system and service for facilitating organizational testing of employees in order to determine their potential susceptibility to phishing scams is disclosed to evaluate their susceptibility to e-mail and Internet cybercrimes such as phishing. The e-mail addresses of a client organization's employees are provided to the system, a phishing e-mail is created and customized, and a phishing e-mail campaign in which the phishing e-mail message is sent and the responses to the phishing e-mail is monitored, and the results of the e-mail campaign are provided for evaluation. The phishing e-mail may optionally contain attachments and various types of probes and "call home" mechanisms.

18 Claims, 10 Drawing Sheets

Related U.S. Application Data continuation of application No. 13/360,420, filed on Jan. 27, 2012, now Pat. No. 8,484,741.

(51) Int. Cl.
  *G06Q 10/10* (2012.01)
  *H04L 29/06* (2006.01)

(56) References Cited

U.S. PATENT DOCUMENTS

| | | | |
|---|---|---|---|
| 7,490,356 B2 | 2/2009 | Lieblich et al. | |
| 7,788,723 B2 | 8/2010 | Huddleston | |
| 7,865,958 B2 | 1/2011 | Lieblich et al. | |
| 7,904,518 B2* | 3/2011 | Marino | G06F 21/56 709/204 |
| 7,971,246 B1 | 6/2011 | Emigh et al. | |
| 8,296,376 B2 | 10/2012 | Goldberg et al. | |
| 8,326,936 B2* | 12/2012 | Marino | G06F 21/56 709/206 |
| 8,332,918 B2 | 12/2012 | Vedula et al. | |
| 8,464,346 B2 | 6/2013 | Barai et al. | |
| 8,484,741 B1 | 7/2013 | Chapman | |
| 9,002,018 B2* | 4/2015 | Wilkins | H04L 9/006 380/281 |
| 2002/0091940 A1 | 7/2002 | Welborn et al. | |
| 2005/0132225 A1 | 6/2005 | Gearhart | |
| 2005/0183143 A1 | 8/2005 | Anderholm et al. | |
| 2006/0053293 A1* | 3/2006 | Zager | G06Q 10/107 713/176 |
| 2006/0075028 A1* | 4/2006 | Zager | G06Q 10/107 709/206 |
| 2006/0123478 A1* | 6/2006 | Rehfuss | H04L 63/1408 726/22 |
| 2006/0271631 A1 | 11/2006 | Qureshi et al. | |
| 2007/0005984 A1* | 1/2007 | Florencio | H04L 63/14 713/178 |
| 2007/0039038 A1* | 2/2007 | Goodman | H04L 63/1408 726/2 |
| 2007/0044149 A1* | 2/2007 | Xavier | G06F 21/562 726/22 |
| 2007/0118528 A1* | 5/2007 | Choi | H04L 12/585 |
| 2007/0294352 A1 | 12/2007 | Shraim et al. | |
| 2008/0047017 A1 | 2/2008 | Renaud | |
| 2008/0271124 A1 | 10/2008 | Nisbet et al. | |
| 2008/0288330 A1 | 11/2008 | Hildebrand et al. | |
| 2009/0006532 A1* | 1/2009 | Sinn | H04L 12/585 709/203 |
| 2009/0064325 A1* | 3/2009 | Ford | H04L 63/1483 726/22 |
| 2009/0077637 A1* | 3/2009 | Santos | H04L 63/1483 726/5 |
| 2009/0144308 A1* | 6/2009 | Huie | H04L 63/1483 |
| 2009/0172772 A1 | 7/2009 | Souille | |
| 2009/0318130 A1 | 12/2009 | Naylor et al. | |
| 2009/0328208 A1* | 12/2009 | Peters | G06F 21/51 726/22 |
| 2010/0125911 A1 | 5/2010 | Bhaskaran | |
| 2010/0138925 A1 | 6/2010 | Barai et al. | |
| 2010/0235918 A1 | 9/2010 | Mizrahi et al. | |
| 2010/0299292 A1 | 11/2010 | Collazo | |
| 2011/0061089 A1 | 3/2011 | O'Sullivan et al. | |
| 2011/0184877 A1 | 7/2011 | McHugh et al. | |
| 2012/0124671 A1* | 5/2012 | Fritzson | G06F 21/577 726/26 |
| 2012/0204032 A1* | 8/2012 | Wilkins | H04L 9/006 713/170 |
| 2012/0258437 A1 | 10/2012 | Sadeh-Koniecpol et al. | |
| 2013/0110614 A1 | 5/2013 | Wagner et al. | |
| 2013/0145465 A1* | 6/2013 | Wang | G06F 21/552 726/23 |
| 2013/0203023 A1 | 8/2013 | Sadeh-Koniecpol et al. | |
| 2014/0199663 A1 | 7/2014 | Sadeh-Koniecpol et al. | |
| 2014/0199664 A1 | 7/2014 | Sadeh-Koniecpol et al. | |

OTHER PUBLICATIONS

Exhibit 1001, U.S. Pat. No. 8,484,741 to Chapman Technology Group, Inc., filed on Jun. 8, 2015 in IPR2015-01356 of U.S. Pat. No. 8,484,741, United States Patent and Trademark Office, Patent Trial and Appeal Board.

Exhibit 1002, Declaration of Dr. Markus Jakobsson, filed on Jun. 8, 2015 in IPR2015-01356 of U.S. Pat. No. 8,484,741, United States Patent and Trademark Office, Patent Trial and Appeal Board.

Exhibit 1003, PhishMe: The Easy Way to Enhance Employee Phishing Awareness, filed on Jun. 8, 2015 in IPR2015-01356 of U.S. Pat. No. 8,484,741, United States Patent and Trademark Office, Patent Trial and Appeal Board.

Exhibit 1004, Measuring the Human Factor of Cyber Security, filed on Jun. 8, 2015 in IPR2015-01356 of U.S. Pat. No. 8,484,741, United States Patent and Trademark Office, Patent Trial and Appeal Board.

Exhibit 1005, How to Create a Self-Signed Digital Certificate in Microsoft Office 2010, filed on Jun. 8, 2015 in IPR2015-01356 of U.S. Pat. No. 8,484,741, United States Patent and Trademark Office, Patent Trial and Appeal Board.

Exhibit 1006, Fostering E-Mail Security Awareness: The West Point Carrondade, filed on Jun. 8, 2015 in IPR2015-01356 of U.S. Pat. No. 8,484,741, United States Patent and Trademark Office, Patent Trial and Appeal Board.

Exhibit 1007, U.S. Pat. No. 8,296,376 to International Business Machines Corporation, filed on Jun. 8, 2015 in IPR2015-01356 of U.S. Pat. No. 8,484,741, United States Patent and Trademark Office, Patent Trial and Appeal Board.

Exhibit 1008, U.S. Patent Publication No. US2013-0110614, filed on Jun. 8, 2015 in IPR2015-01356 of U.S. Pat. No. 8,484,741, United States Patent and Trademark Office, Patent Trial and Appeal Board.

Exhibit 1009, U.S. Patent Publication No. US2009-0318130, filed on Jun. 8, 2015 in IPR2015-01356 of U.S. Pat. No. 8,484,741, United States Patent and Trademark Office, Patent Trial and Appeal Board.

Exhibit 1010, U.S. Pat. No. 8,332,918 to Novell, Inc., filed on Jun. 8, 2015 in IPR2015-01356 of U.S. Pat. No. 8,484,741, United States Patent and Trademark Office, Patent Trial and Appeal Board.

Exhibit 1011, Mitigating the Risk of Social Engineering Attacks, filed on Jun. 8, 2015 in IPR2015-01356 of U.S. Pat. No. 8,484,741, United States Patent and Trademark Office, Patent Trial and Appeal Board.

Exhibit 1012, Building an Encrypted and Searchable Audit Log, filed on Jun. 8, 2015 in IPR2015-01356 of U.S. Pat. No. 8,484,741, United States Patent and Trademark Office, Patent Trial and Appeal Board.

Exhibit 1013, Automatically Encrypting all Incoming Email, filed on Jun. 8, 2015 in IPR2015-01356 of U.S. Pat. No. 8,484,741, United States Patent and Trademark Office, Patent Trial and Appeal Board.

Exhibit 1014, Decision Institution of Inter Partes Review Case IPR2014-00531, filed on Jun. 8, 2015 in IPR2015-01356 of U.S. Pat. No. 8,484,741, United States Patent and Trademark Office, Patent Trial and Appeal Board.

Exhibit 1015, Curriculum Vitae for Dr. Markus Jakobsson, filed on Jun. 8, 2015 in IPR2015-01356 of U.S. Pat. No. 8,484,741, United States Patent and Trademark Office, Patent Trial and Appeal Board.

Document 1, Petition for Inter Partes Review of U.S. Pat. No. 8,484,741, filed on Jun. 8, 2015 in IPR2015-01356 of U.S. Pat. No. 8,484,741, United States Patent and Trademark Office, Patent Trial and Appeal Board.

Exhibit 1001, U.S. Pat. No. 8,484,741 to Chapman, filed on Mar. 24, 2014 in IPR2014-00531 of U.S. Pat. No. 8,484,741, United States Patent and Trademark Office, Patent Trial and Appeal Board.

Exhibit 1002, Declaration of Dr. Markus Jakobsson, filed on Mar. 24, 2014 in IPR2014-00531 of U.S. Pat. No. 8,484,741, United States Patent and Trademark Office, Patent Trial and Appeal Board.

Exhibit 1003, PhishMe the Easy Way, filed on Mar. 24, 2014 in IPR2014-00531 of U.S. Pat. No. 8,484,741, United States Patent and Trademark Office, Patent Trial and Appeal Board.

(56) References Cited

OTHER PUBLICATIONS

Exhibit 1004, Designing Ethical Phishing Experiments a Study of (ROT13) rOnl Query Features, filed on Mar. 24, 2014 in IPR2014-00531 of U.S. Pat. No. 8,484,741, United States Patent and Trademark Office, Patent Trial and Appeal Board.
Exhibit 1005, Phishing Drills Teach Employees to Dodge the Hook, filed on Mar. 24, 2014 in IPR2014-00531 of U.S. Pat. No. 8,484,741, United States Patent and Trademark Office, Patent Trial and Appeal Board.
Exhibit 1006, Core Impact Penetration Tester Goes Phishing, filed on Mar. 24, 2014 in IPR2014-00531 of U.S. Pat. No. 8,484,741, United States Patent and Trademark Office, Patent Trial and Appeal Board.
Exhibit 1007, Applicants Preliminary Amendment, filed on Mar. 24, 2014 in IPR2014-00531 of U.S. Pat. No. 8,484,741, United States Patent and Trademark Office, Patent Trial and Appeal Board.
Exhibit 1008, U.S. Patent Office Interview Summary, filed on Mar. 24, 2014 in IPR2014-00531 of U.S. Pat. No. 8,484,741, United States Patent and Trademark Office, Patent Trial and Appeal Board.
Exhibit 1009, U.S. Patent Office Notice of Allowance, filed on Mar. 24, 2014 in IPR2014-00531 of U.S. Pat. No. 8,484,741, United States Patent and Trademark Office, Patent Trial and Appeal Board.
Exhibit 1010, Curriculum Vitae for Dr. Markus Jakobsson, filed on Mar. 24, 2014 in IPR2014-00531 of U.S. Pat. No. 8,484,741, United States Patent and Trademark Office, Patent Trial and Appeal Board.
Document 1, Petition for Inter Partes Review of U.S. Pat. No. 8,484,741, filed on Mar. 24, 2014 in IPR2014-00531 of U.S. Pat. No. 8,484,741, United States Patent and Trademark Office, Patent Trial and Appeal Board.
Document 2, Petitioner Phishme, Inc.'s Power of Attorney, filed on Mar. 24, 2014 in IPR2014-00531 of U.S. Pat. No. 8,484,741, United States Patent and Trademark Office, Patent Trial and Appeal Board.
Document 3, Notice of Filing Date Accorded to Petition and Time for Filing Patent Owner Preliminary Response, filed on Apr. 4, 2014 in IPR2014-00531 of U.S. Pat. No. 8,484,741, United States Patent and Trademark Office, Patent Trial and Appeal Board.
Document 4, Chapman Technology Group Inc's Power of Attorney in an Inter Partes Review, filed on Apr. 4, 2014 in IPR2014-00531 of U.S. Pat. No. 8,484,741, United States Patent and Trademark Office, Patent Trial and Appeal Board.
Document 5, Chapman Technology Group Inc's Power of Attorney in an Inter Partes Review, filed on Apr. 4, 2014 in IPR2014-00531 of U.S. Pat. No. 8,484,741, United States Patent and Trademark Office, Patent Trial and Appeal Board.
Document 6, Chapman Technology Group Inc's Mandatory Notices, filed on Apr. 4, 2014 in IPR2014-00531 of U.S. Pat. No. 8,484,741, United States Patent and Trademark Office, Patent Trial and Appeal Board.
Document 7, Chapman Technology Group Inc's Preliminary Response to Petition for Inter Partes Review under 37 C.F.R. § 42.107, filed on Jul. 1, 2014 in IPR2014-00531 of U.S. Pat. No. 8,484,741, United States Patent and Trademark Office, Patent Trial and Appeal Board.
Document 8, Decision—Institution of Inter Partes Review, filed on Sep. 3, 2014 in IPR2014-00531 of U.S. Pat. No. 8,484,741, United States Patent and Trademark Office, Patent Trial and Appeal Board.
Document 9, Scheduling Order, filed on Sep. 3, 2014 in IPR2014-00531 of U.S. Pat. No. 8,484,741, United States Patent and Trademark Office, Patent Trial and Appeal Board.
Document 10, Patent Owner Chapman Technology Group, Inc.'s Proposed Motions, filed on Sep. 30, 2014 in IPR2014-00531 of U.S. Pat. No. 8,484,741, United States Patent and Trademark Office, Patent Trial and Appeal Board.
Document 11, Petitioner Phishme Inc.'s Proposed Motions, filed on Sep. 30, 2014 in IPR2014-00531 of U.S. Pat. No. 8,484,741, United States Patent and Trademark Office, Patent Trial and Appeal Board.
Document 12, Initial Conference Summary—Conduct of the Proceeding 37 C.F.R. § 42.5, filed on Oct. 2, 2014 in IPR2014-00531 of U.S. Pat. No. 8,484,741, United States Patent and Trademark Office, Patent Trial and Appeal Board.
United States Patent and Trademark Office Before the Patent Trial and Appeal Board; *Phishme, Inc.*, Petitioner v. *Phishline, LLC*, Patent Owner; Case IPR2015-01356, U.S. Pat. No. 8,484,741 B1; Decision Institution of Inter Partes Review 37 C.F.R. § 42.108; Nov. 19, 2015; 40 pages.
Robert A. Lawler et al on Behalf of Phishline.; *Phishme, Inc.*, Petitioner v. *Phishline, LLC*, Patent Owner; Case IPR2015-01356, U.S. Pat. No. 8,484,741 B1; Phishline LLC's Preliminary Response to Petition for Inter Partes Review 37 C.F.R. § 42.107; Sep. 18, 2015.
U.S. Appl. No. 13/934,850, filed Jul. 3, 2013.
U.S. Appl. No. 13/360,420, filed Jan. 27, 2012.

\* cited by examiner

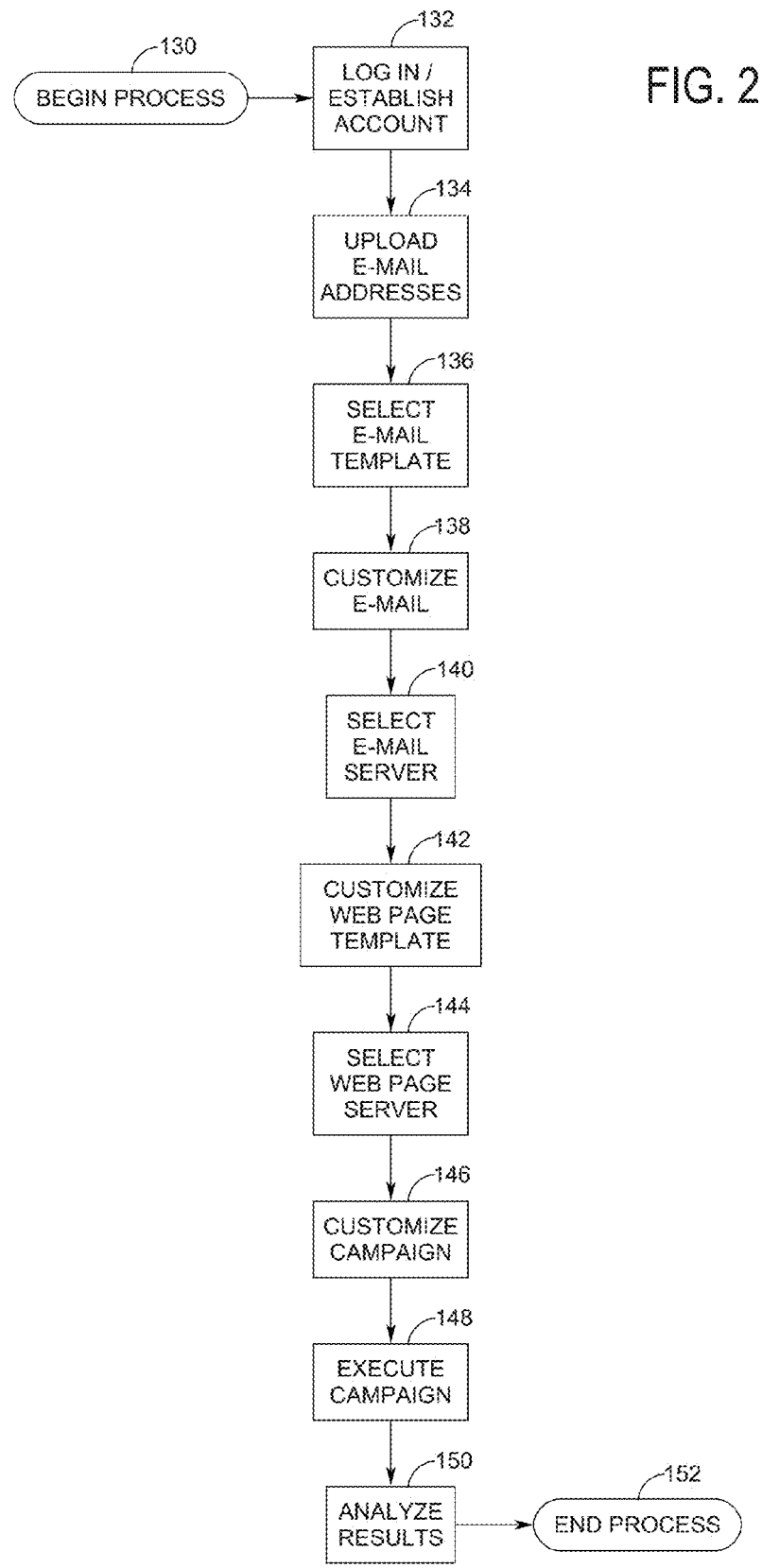

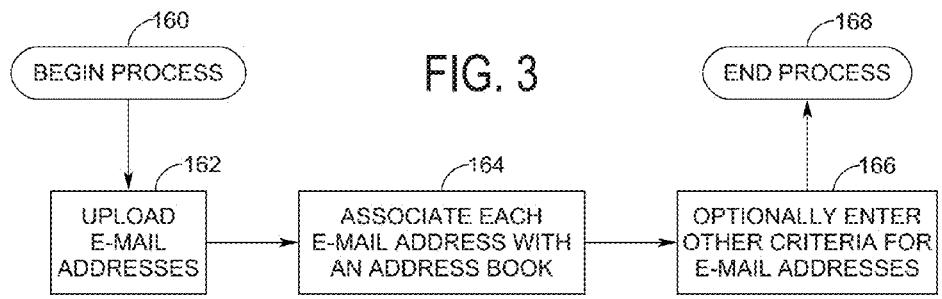
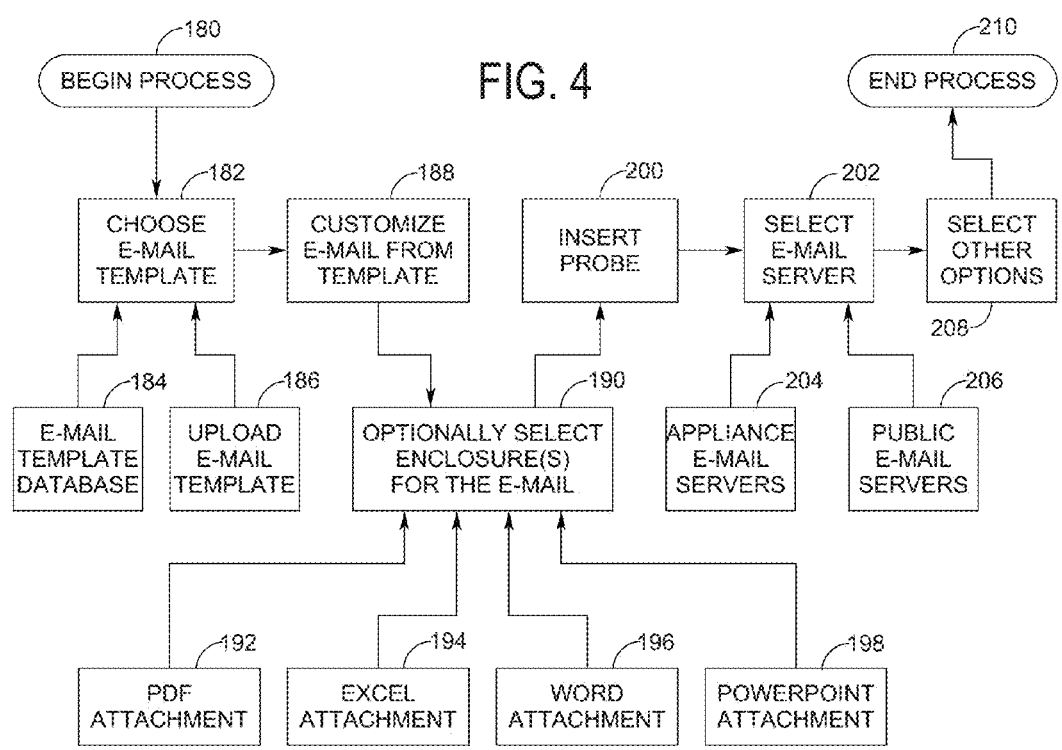

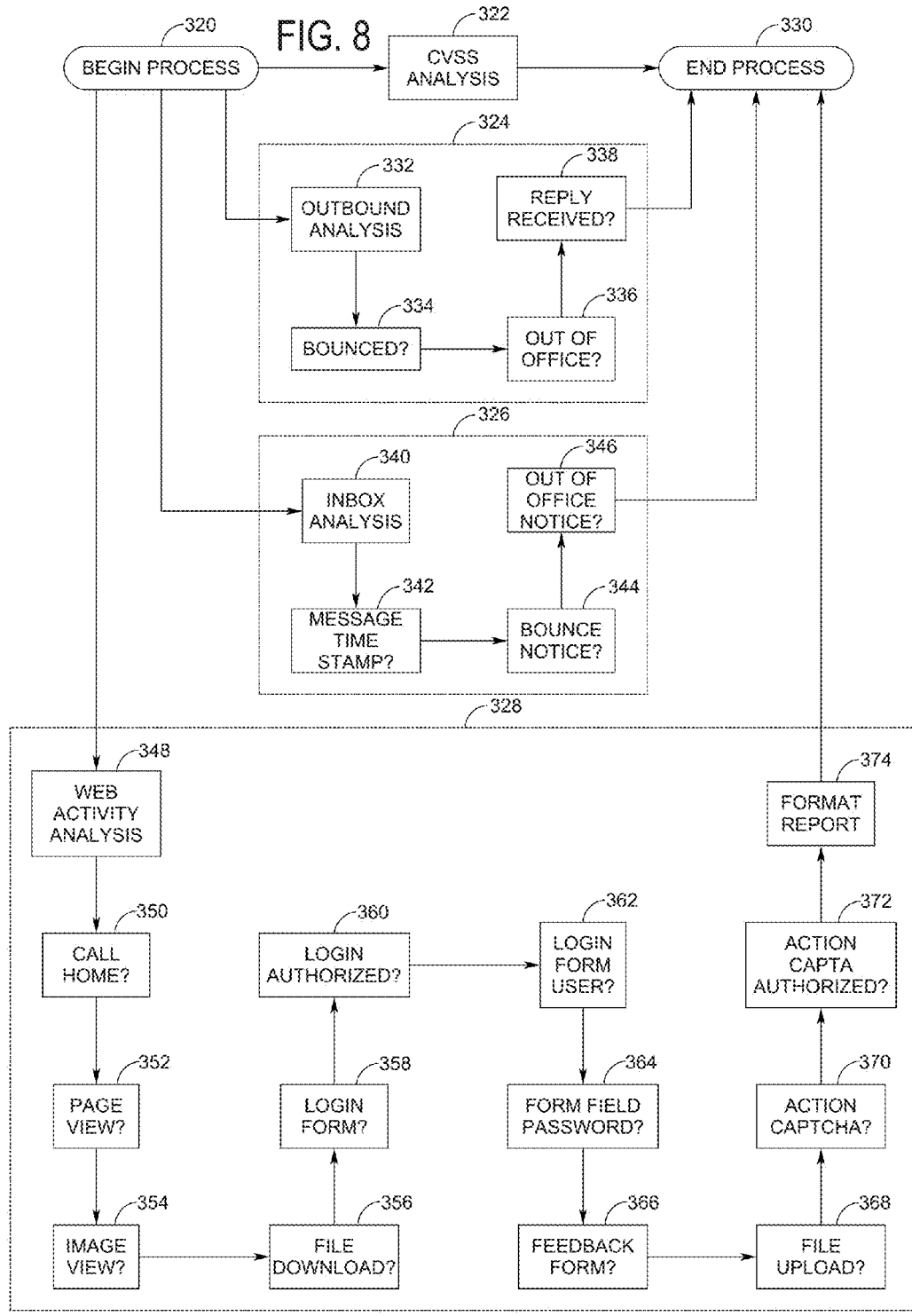

FIG. 9  Upload Email Address
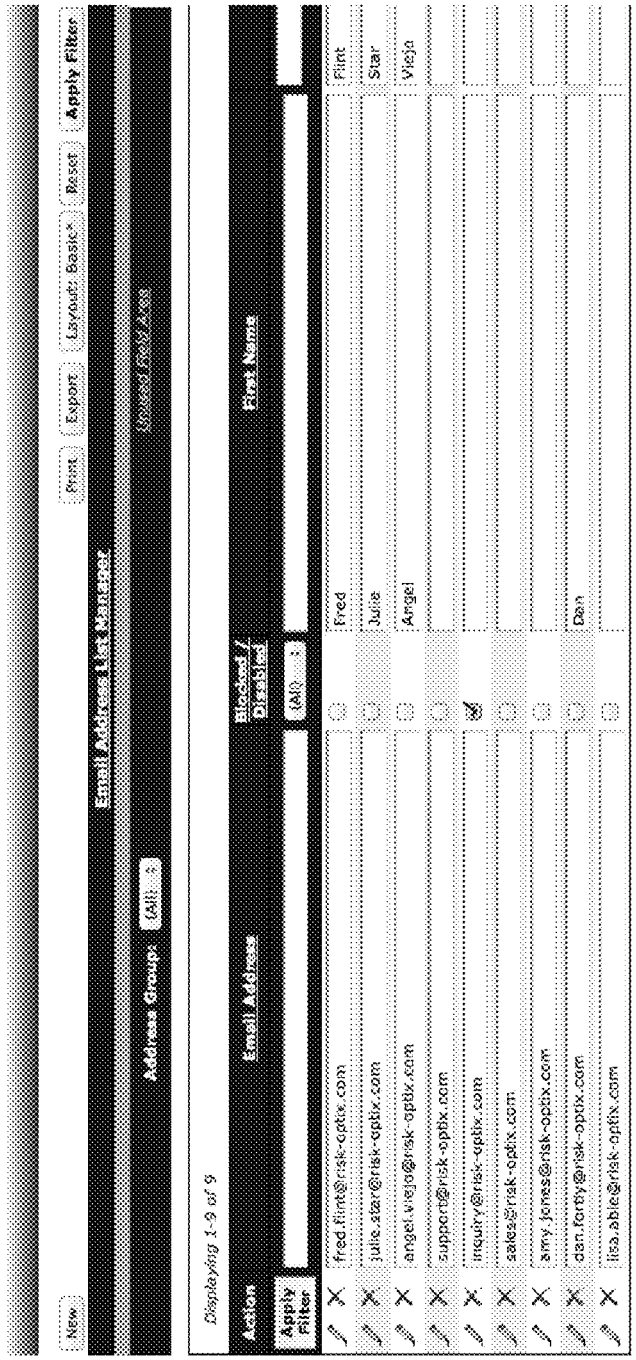

FIG. 10  Customize Message

From: karlzoom@riskimpact.org
To: (each of the target emails above)
Subject: Employee Survey Hi (FirstName), I'd like you to try the new Employee Survey we'll be using later this year. Just click the following link and login using your usual username and password.

http://riskimpact.org/tmp/demo/survey.php?authcode=d43sd

If your login doesn't work, just reply to this message and I'll have someone work with you to figure out what the trouble is.

Thanks,

Karl Zoom, Vice President Information Technology
123 Oak Street
Madison, WI 53573
Phone: 608.123.4567
karlzoom@anybank.com   www.anybank.com
Please consider the environment before printing this email.

SOFTWARE SERVICE TO FACILITATE ORGANIZATIONAL TESTING OF EMPLOYEES TO DETERMINE THEIR POTENTIAL SUSCEPTIBILITY TO PHISHING SCAMS

CROSS-REFERENCE TO RELATED APPLICATIONS

This patent application is a continuation of co-pending U.S. patent application Ser. No. 13/934,850, filed on Jul. 3, 2013, which is a continuation of U.S. patent application Ser. No. 13/360,420, filed on Jan. 27, 2012, now U.S. Pat. No. 8,484,741, granted on Jul. 9, 2013, which are assigned to the assignee of the present patent application and which are hereby incorporated herein by reference in their entirety.

BACKGROUND OF THE INVENTION

Field of the Invention

The present invention relates generally to susceptibility to e-mail and Internet cybercrimes such as phishing, and more particularly to a software service that facilitates organizational testing of employees in order to determine their potential susceptibility to phishing scams.

The massive expansion of Internet usage that has occurred since the mid-1990's has spawned a corresponding increase in cybercrime, which may be broadly defined as any crime that involves a computer and a network (including particularly the Internet). Cybercrimes may be classified into two distinct types: 1. crimes that directly target computers, such as computer viruses, denial-of-service attacks, and malicious code (malware); and 2. crimes that use computer networks (particularly the Internet) to facilitate crimes that advance nefarious ends, including cyberstalking, fraud (such as identity theft), information warfare, and phishing scams.

Phishing is a technique wherein the sender of an e-mail masquerades as a trustworthy sender in an attempt to deceive the receiver into providing personal identity data or other sensitive information such as account usernames, passwords, social security number or other identification information, financial account credentials or other information, etc. to the sender by a return e-mail or similar electronic communication. Phishing usually begins when a "phisher" sends a spoofed e-mail having one or more links that lead the recipient of the spoofed e-mail to one or more unsafe fake websites.

A spoofed e-mail is an e-mail in which the sender's e-mail address and other parts of the e-mail header are altered to appear as though the e-mail originated from a different and well-known (and authentic) address. Since SMTP e-mails do not provide any authentication, it is relatively simple for phishers to conceal the actual origin of an e-mail message, and make an e-mail appear to have come from an authentic and trustworthy sender. The spoofed phishing e-mail may appear to be authentic, and carry graphics and have a layout that is similar or even identical to the authentic website.

The phishing e-mail typically directs the e-mail recipient to click on a link to the fake website operated by the phisher, where the e-mail recipient may then be directed to enter confidential information at a fake website the look and feel of which may be virtually identical to a legitimate website. The e-mail recipient is then typically directed to enter confidential information at the fake website, such as personal identity data or other sensitive information such as account usernames, passwords, social security number or other identification information, financial account credentials (such as credit card numbers) or other information. This information may subsequently be used by the phisher to access the e-mail recipients' various accounts, including secured websites of the employer of the e-mail recipient, or to rob the e-mail recipient's financial accounts.

Alternately, the unsafe website may be designed to download malicious code onto the e-mail recipient's machine that captures the e-mail recipient's personal information directly. Phishing e-mails are hard to identify since phishers take pains to make their e-mails appear genuine. The e-mails often are virtually identical to or closely resemble recognizable e-mails sent out routinely by legitimate organizations such as the e-mail recipient's employer, or banks and credit card companies and the like. These e-mails often convince the e-mail recipients to select links included within the e-mails which lead the e-mail recipients to divulging their confidential and/or personal information.

As might be expected, various proposals designed to address these problems in some fashion have been proposed. For example, U.S. Pat. No. 6,954,858 and U.S. Patent Application Publication No. 2002/0091940, both to Welborn et al., disclose systems to reinforce and measure a change in user behavior. The inventions send an e-mail with an attachment to e-mail users and create a list of e-mail users that open the attachment. The e-mail users are sent an e-mail with an attachment that looks similar to attachments that contain computer viruses. If the attachment is opened, an e-mail is sent to a specific e-mail address. This e-mail address collects all of the e-mail from e-mail users who have not changed behavior and need additional education or management attention.

Another example is U.S. Pat. No. 8,464,346, to Barai et al., which discloses a method for simulating a hacking attack on a network comprising at least one of a plurality of data processing units (DPU's), a plurality of users, and a plurality of communication links, to assess vulnerabilities of the network. An automated social engineering attack is performed to gain access to critical information that pertains to the plurality of users. The automated social engineering attack can be performed by performing at least one of modeling the psychology of human mind, creating the human profile, and impersonating or building the trust between an attacker and a target, and then selecting and launching the attack, sniffing a mail from the Network to impersonate the plurality of users, and crafting the replies of the mail, including a malicious link in the reply, thereby luring the plurality of users to leak the critical information.

Still another example is U.S. Pat. No. 7,788,723, to Huddleston, which discloses a method in which an exploit probe is sent to a subscriber's computer system, and a message based on the computer system's (and the user's) response to the exploit probe is generated. U.S. Pat. Nos. 6,954,858, 7,788,723, and 8,464,346 and U.S. Patent Application Publication No. 2002/0091940 are each hereby incorporated herein by reference in their entirety.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The susceptibility of individuals in an organization to e-mail and Internet cybercrimes such as phishing discussed above are addressed by the present invention. With this invention, a system and method of providing a service to companies in order to assess the vulnerability of the company's employees to phishing schemes so that it may be addressed is provided. The assessment includes information related to both user behavior and technical vulnerability exposure. In addition to information regarding users and the actions they performed, probes are used to collect browser and operating system version information and to analyze plug-ins and query the user's browser to understand its capabilities, such as knowing if JavaScript or Java has been enabled. The service evaluates, manages, and documents the current state of a company's risk profile and control environment using a three-step system.

In a first step, the e-mail addresses of the company's employees to be evaluated by the system may be provided to the system (this step may be done using a web interface). In a second step, one or more phishing e-mail messages to be sent to the company's employees are customized (they may be drafted to appeal to the particular company's employees), the web pages that employees responding to the phishing e-mail message will view are created and customized (again to appeal to the particular company's employees), and a phishing e-mail campaign is implemented. In a third step, the results of the e-mail campaign are prepared and provided to the company for evaluation. The e-mail server used to send the phishing e-mails may be selected to be e-mail servers operated by the system or public e-mail servers, and the web server that will display the web pages that employees responding to the phishing e-mail message will view may be web servers operated by the system or public web servers.

Typical statistical results of the program are the number of e-mails that were sent, the number of people that responded, the number that clicked on any link(s) contained in the e-mails, and the number of people that entered confidential information into the website that they viewed. The types of attachments that were opened may also be defined for the company. Additionally, trends such as the performance compared to previous e-mail campaigns or to benchmarks may also be provided to the company. Suggestions on addressing technical vulnerabilities may optionally be provided as well.

The service will be appealing to most companies, but it is believed that it will be particularly appealing to the companies operating in the financial sector, such as banks, savings and loans, credit unions, etc., as well as to other regulated industries, private industries, and government organizations.

In a system embodiment, an appliance comprising at least one processor device is accessible by the information technology administrator of a client organization to set up a phishing e-mail campaign, the appliance comprising: a first module configured to facilitate entry of the e-mail addresses of a group of individuals into one or more address books; a second module configured to facilitate creation of a phishing e-mail that includes at least a link; a third module configured to facilitate creation of a web page accessible by a recipient of the phishing e-mail by clicking on the link included in the phishing e-mail; a fourth module configured to facilitate establishment of a campaign by selecting and correlating at least one address book and at least one phishing e-mails to be sent; a fifth module configured to execute the campaign by sending the phishing e-mail(s) to the group of individuals in the address book(s); a sixth module configured to monitor responses to the phishing e-mail(s) by interacting with recipients of phishing e-mail(s) who respond by providing potentially confidential information while avoiding collecting potentially confidential information provided by recipients of phishing e-mail(s); and a seventh module configured to provide analysis of responses to the phishing e-mail(s) for review by the information technology administrator.

In another system embodiment, an appliance comprising at least one processor device is accessible by the information technology administrator of a client organization to set up a phishing e-mail campaign, the appliance comprising: an address book manager module configured to facilitate the input by the information technology administrator of the e-mail addresses of the group of individuals into one or more address books; an e-mail manager module configured to facilitate the creation by the information technology administrator of at least one phishing e-mail; a message generation module configured to execute a campaign by sending the phishing e-mails to the group(s) of individuals in the address book(s); a monitoring module configured to monitor responses to the phishing e-mails by interacting with recipients of phishing e-mails who respond by providing potentially confidential information while avoiding collecting potentially confidential information provided by recipients of phishing e-mails; and a report generating module configured to provide analysis of responses to the phishing e-mails for review by the information technology administrator.

In a method embodiment, an appliance is provided which appliance comprises at least one processor device that is accessible by the information technology administrator of a client organization to set up a phishing e-mail campaign by performing the steps of: entering the e-mail addresses of a group of individuals into one or more address books; creating a phishing e-mail that includes at least one link; creating a web page that is accessible by a recipient of the phishing e-mail by clicking on the link included in the phishing e-mail; setting up a campaign by selecting and correlating one or more of the address books and one or more phishing e-mails to be sent; monitoring responses to the phishing e-mails by interacting with recipients of phishing e-mails who respond by providing potentially confidential information while avoiding collecting potentially confidential information provided by recipients of phishing e-mails; and providing analysis of responses to the phishing e-mails for review by the information technology administrator.

The software system and service for facilitating organizational testing of employees in order to determine their potential susceptibility to phishing scams is useful to information technology administrators to assist them to evaluate their organizations' susceptibility to e-mail and Internet cybercrimes such as phishing. The phishing scam susceptibility testing service of the present invention offers an excellent return on investment to enhance its market appeal and to thereby afford it the broadest possible market. Finally, the phishing scam susceptibility testing service of the present invention achieves numerous advantages without incurring any substantial relative disadvantage.

DESCRIPTION OF THE DRAWINGS

These and other advantages of the present invention are best understood with reference to the drawings, in which:

FIG. 2 is a somewhat schematic block diagram showing an overview of the method that may be used by information technology administrators of the client organization to utilize the phishing scam susceptibility testing service of the present invention to assess the susceptibility of the client organization's computer and smartphone systems to phishing scams;

FIG. 3 is a somewhat schematic block diagram showing the operation of the address book manager module of FIG. 1 to upload e-mail addresses of employees of the client organization;

FIG. 4 is a somewhat schematic block diagram showing the operation of the e-mail template manager and e-mail server manager modules of FIG. 1 to prepare e-mails to be sent to employees of the client organization and to select the servers from which the e-mails will be sent;

FIG. 8 is a flowchart showing the operation of the incident response testing module as it derives various information from the responses received by the phishing scam susceptibility testing system in response to the e-mail invitations sent to users who are employees of the client organization;

FIG. 9 is a screenshot of a web page in which e-mail addresses of employees of the client organization have been uploaded and may be categorized into groups;

FIG. 10 is a screenshot of a web page in which an e-mail message to be sent to the employees of the client organization may be customized;

FIG. 11 is a screenshot of a phishing web page to which employees of the client organization responding to the e-mail message will be directed to.

DETAILED DESCRIPTION OF THE PREFERRED EMBODIMENT

Figure 1:
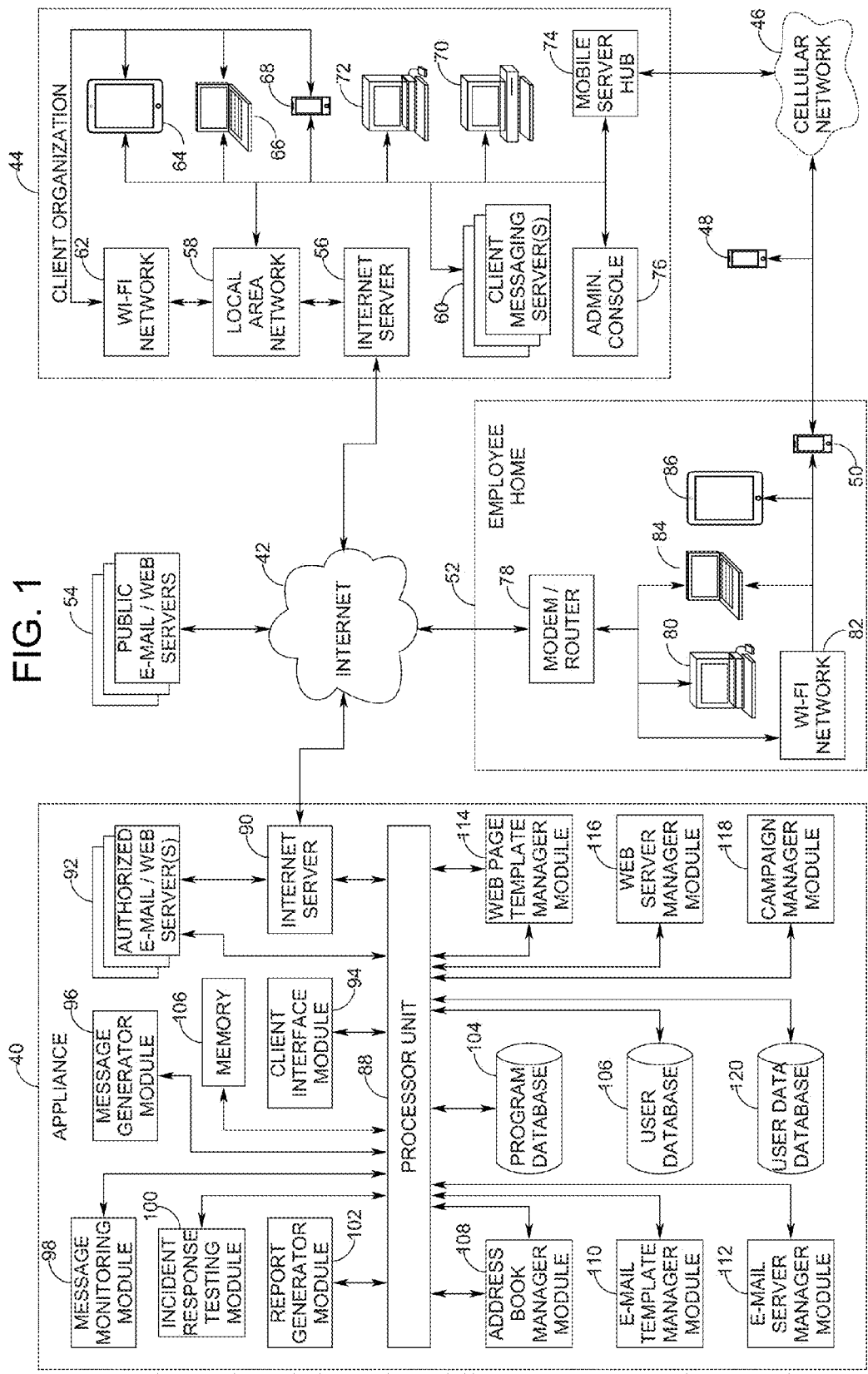
FIG. 1 is a somewhat schematic block diagram showing an overview of an exemplary system that may be used by the phishing scam susceptibility testing service of the present invention in networked communication with the computer systems of a client organization and the computer and smartphone systems of the client organization's employees.

The preferred embodiment on the phishing scam susceptibility testing service of the present invention is illustrated in schematic block diagram fashion in FIG. 1, which shows an overview of a system for providing the phishing scam susceptibility testing service in conjunction with the Internet and the networked computer systems of a client organization as well as the client organization's employees' computers. The susceptibility testing service of the present invention is provided using an appliance 40, which is connected via the Internet 42 to a client organization computer network 44. The client organization computer network 44 is connected to a cellular network 46, to which employee smartphones 48 and 50 are connected.

The client organization computer network 44 is also connected via the Internet 42 to an employee home network 52. Also shown connected to the Internet 42 are public e-mail/web servers 54. The Internet 42, the client organization computer network 44, the cellular network 46, the employee smartphones 48 and 50, the employee home network 52, and the public e-mail/web servers 54 are entirely conventional, with the invention of the present invention residing entirely in the system of the appliance 40 and its methods of operation.

The client organization computer network 44 has an Internet server 56 that is operatively connected to the Internet 42 and to which a local area network (LAN) 58 is operatively interconnected. The client organization has a client messaging server 60 that is operatively interconnected to the local area network 58 to provide e-mail service for the client organization. The local area network 58 is operatively interconnected to drive a Wi-Fi network 62 which broadcasts within the building(s) of the client organization. Within the client organization and its building(s), a number of tablet computers 64, laptop computers 66, and smartphones 68 are operatively interconnected to the local area network 58 either directly or through the Wi-Fi network 62.

A number of desktop computers 70 and computer terminals 72 are also operatively interconnected to the local area network 58. Also shown in the client organization computer network 44 is a mobile server hub 74 that is operatively interconnected to the cellular network 46 to communicate with the employee smartphones 48 and 50. Finally, the client organization computer network 44 is shown schematically as having an administrative console 76, which will be used by information technology administrators of the client organization to interact with the phishing scam susceptibility testing service of the present invention in order to assess the susceptibility of the client organization's computer and smartphone systems to phishing scams.

The employee home network 52 is operatively connected to the Internet 42 with a modem and router 78, enabling the employee home network 52 to communicate with the network of the client organization computer network 44. The modem and router 78 are shown as being operatively interconnected to a desktop computer 80. The modem and router 78 is also operatively interconnected to drive a Wi-Fi network 82 which broadcasts within the employee's home. Within the employee's home, a laptop computer 84 is operatively interconnected to the modem and router 78 either directly or through the Wi-Fi network 82. Finally, a tablet computer 86 and the smartphone 50 are operatively interconnected to the modem and router 78 through the Wi-Fi network 82.

The appliance 40 includes a processor unit 88 to which a variety of appliance system hardware and system modules are operatively interconnected. The processor unit 88 is connected via an Internet server 90 to the Internet 42. The appliance 40 has a plurality of authorized e-mail/web servers 92 which are operatively interconnected to the processor unit 88 and are also connected via the Internet server 90 to the Internet 42. A client interface module 94 that is operatively interconnected with the processor unit 88 is used to facilitate the information technology administrators of the client organization to interact with the phishing scam susceptibility testing service of the present invention.

A message generator module 96 that is operatively interconnected with the processor unit 88 is used to generate and send phishing scam e-mails that will be sent to employees of the client organization. A message monitoring module 98 that is operatively interconnected with the processor unit 88 is used to receive responses to the phishing scam e-mails. An incident response testing module 100 that is operatively interconnected with the processor unit 88 is used to analyze the responses to the phishing scam e-mails that are received by the message monitoring module 98.

A report generator 102 that is operatively interconnected with the processor unit 88 is used to generate reports summarizing the outcome of the phishing scam susceptibility testing performed by the phishing scam susceptibility testing service of the present invention to the information technology administrators of the client organization. A program database 104 that is operatively interconnected with the processor unit 88 is used to store data used by the phishing scam susceptibility testing system that is not stored in firmware. A user database 106 that is operatively interconnected with the processor unit 88 is used to store information relating to client organizations that are utilizing the phishing scam susceptibility testing system.

An address book manager module 108 that is operatively interconnected with the processor unit 88 is used to allow the information technology administrators of the client organization to add e-mail addresses of employees of the client organization and to sort the e-mail addresses into different groups if desired. Different groups may be used to categorize employees into various different classifications, such as executives, different departments, etc. An e-mail template manager module 110 that is operatively interconnected with the processor unit 88 is used to allow the information technology administrators of the client organization to create and edit phishing scam e-mails that will be sent to employees of the client organization. An e-mail server manager module 112 that is operatively interconnected with the processor unit 88 is used to allow the information technology administrators of the client organization to select the messaging servers from which the phishing scam e-mails will be sent to employees of the client organization. The e-mail server(s) selected may be either or both of e-mail servers included in the authorized e-mail/web servers 92 and e-mail servers included in the public e-mail/web servers 54.

A web page template manager module 114 that is operatively interconnected with the processor unit 88 is used to allow the information technology administrators of the client organization to create and edit the websites that recipient employees of the phishing scam e-mails will see if they click on a link in the phishing scam e-mails. A web server manager module 116 that is operatively interconnected with the processor unit 88 is used to allow the information technology administrators of the client organization to select the web page servers that will serve the websites that recipient employees of the phishing scam e-mails will see if they click on a link in the phishing scam e-mails. The web server(s) selected may be either or both of web servers included in the authorized e-mail/web servers 92 and web servers included in the public e-mail/web servers 54.

A campaign manager module 118 that is operatively interconnected with the processor unit 88 is used to allow the information technology administrators of the client organization to schedule a campaign in which selected ones of potentially multiple phishing e-mails set up by the e-mail template manager module 110 to be sent from one or more selected e-mail server(s) set by the e-mail server manager module 112 and having links to selected ones of potentially multiple web servers selected by the web server manager module 116 and having web pages set up by the web page template manager module 114. The schedule can include sending multiple phishing scam e-mails to multiple groups of employees of the client organization with a number of other options which will be discussed in greater detail below. A user data database 120 that is operatively interconnected with the processor unit 88 is used to store all client organization information including to the phishing scam e-mails, the phishing scam e-mail servers, the phishing scam web page templates, the phishing scam web page servers, and the phishing scam campaigns, as well as the results of the phishing scam susceptibility testing.

Referring next to FIG. 2, an overview of the method that may be used by information technology administrators of the client organization to utilize the phishing scam susceptibility testing system illustrated in FIG. 1 to assess the susceptibility of the client organization's computer and smartphone systems to phishing scams is shown. From an initiate process step 130, the process begins with a log in/establish account step 132 in which the information technology administrator of the client organization either logs into the phishing scam susceptibility testing system if the client organization is already registered or establishes a new account if the client organization is not yet registered. Logging in is a typical process in which a user name and a password must be entered upon which the phishing scam susceptibility testing system recognizes the client organization and allows access with screens displayed as appropriate for the status of the process.

The process then moves to an upload e-mail addresses step 134 in which the information technology administrator of the client organization can upload the e-mail addresses of the employees of the client organization. Additionally, the employee e-mail addresses can be associated with different groups if desired, with each group of employee e-mail addresses constituting a different address book for the client organization. The different groups can be set up in any way desired, and this is typically done by the administrator of the client organization in a manner that makes sense for the particular client organization. For example, it can be done for different types of employees (e.g., executives, salaried employees, and hourly employees), different departments of groups within the client organization, difference facilities within the client organization, or different subsidiaries of the client organization.

The process next moves to a select e-mail template step 136 in which the information technology administrator of the client organization can select a template for a phishing e-mail that will subsequently be sent to employees of the client organization. A number of templates are readily available from the phishing scam susceptibility testing system, or the information technology administrator of the client organization can upload and use his/her own template. The process then moves to a customize e-mail step 138 in which the selected e-mail template is modified to finalize the content and appearance of the phishing e-mail that will subsequently be sent to employees of the client organization.

The process next moves to a select e-mail server step 140 in which the information technology administrator of the client organization can select the e-mail server(s) from which the phishing e-mail will subsequently be sent to employees of the client organization. The phishing scam susceptibility testing system itself offers a large number of e-mail servers that may be used, or public messaging servers (e.g., Gmail from Google, Hotmail from Microsoft, Yahoo-!Mail from Yahoo!, etc.) may be selected for use to send the phishing scam e-mails.

The process then moves to a customize web page template step 142 in which the information technology administrator of the client organization can prepare a web page to which recipients of the phishing scam e-mail will be directed if they click on a link contained in the phishing scam e-mail. Preferable, the phishing scam susceptibility testing system offers initial web page templates which can be selected and customized to produce the finished phishing scam web page in this step.

The process next moves to a select web page server step 144 in which the information technology administrator of the client organization can select the web page server(s) from which the link in the phishing e-mail will direct employees of the client organization who click on the link in the phishing e-mail. The phishing scam susceptibility testing system itself hosts web page servers that are used to host the customized web pages.

The process then moves to a customize campaign step 146 in which the phishing e-mails that have been prepared in the select e-mail template step 136 and the customize e-mail step 138 are scheduled to be sent to selected ones of the employees of the client organization identified by the e-mail addresses provided in the upload e-mail addresses step 134 from the e-mail server(s) selected in the select e-mail server step 140. The phishing e-mails may be sent as a part of one or more campaigns, each of which has a kickoff date and a target termination date, one or more address books containing the e-mail addresses of employees of the client organization, and optionally a target number of phishing e-mails to be sent. The phishing scam susceptibility testing system is capable of automatically selecting the e-mail addresses to which the phishing e-mails will be sent at random or according to other selection criteria.

The process next moves to an execute campaign step 148 in which the campaign(s) set up in 148 are automatically run. The phishing e-mails will be sent to elected selection criteria, and all responses to the phishing e-mails will be carefully monitored. The responses can include, for example, confirmation from the e-mail recipient's server of delivery, confirmation that the e-mail has been viewed (read) by the recipient, confirmation that any enclosed files have been opened by the recipient, confirmation that the recipient has clicked on any links contained in the e-mail, confirmation that the recipient has viewed the linked web page, and confirmation of any actions taken by the recipient on the web page including downloading or uploading of files, and entry of information including passwords or other confidential information. The operation of this step will be discussed in greater detail in conjunction with FIG. 7 below.

After the campaign(s) is (are) complete, the process finally moves to an analyze results step 150 in which the various statistics associated with the campaign(s) may be reviewed by the information technology administrator of the client organization. These statistics are the numbers and/or percentages of client employees in the campaign(s) who took the various actions referenced above with reference to the execute campaign step 148. The process of the phishing scam susceptibility testing method of the present invention then terminates in a process completion step 152.

Referring now to FIG. 3, the operation of the address book manager module 108 of FIG. 1, which is shown in greater detail than in the upload e-mail addresses step 134 of FIG. 2, is illustrated. The process shown in FIG. 3 begins with a process initiation step 160, and then moves to an upload e-mail addresses step 162 in which the information technology administrator of the client organization uploads the e-mail addresses of the employees of the client organization. This may be done by uploading a single file such as an Excel spreadsheet or an Access database, or in any other suitable manner. For small client organizations, it may also be feasible for the information technology administrator to manually enter the e-mail addresses of the employees of the client organization.

The process next moves to an associate e-mail addresses with address books step 164 in which the information technology administrator of the client organization associates each of the e-mail addresses with an address book. For smaller client organizations or for simple situations, all of the e-mail addresses may be associated with a single address book. Advantageously, the use of different address books for different groups of client organization employees for larger client organizations can facilitate different levels of testing of susceptibility to phishing scams for different employee groups, phased testing of different employee groups at different times, or any other differential testing such as the incident response testing module 100% testing of some employee groups and sampled testing of other employee groups.

The process then moves to an optional step of entry of other criteria for the e-mail addresses 166 in which the information technology administrator of the client organization can enter other criteria the use of which may be beneficial in analyzing the results of the phishing e-mail campaign. For example, some address books may be designated as inactive if the employees contained therein are not to be tested, or additional criteria identifying a particular office or division may be added, a level or category designation (e.g., executive, management, sales, etc.) of employees may be used, and/or the tenure of the employees in the client organization may be included. The process of uploading and grouping the e-mail addresses then terminates in a process termination step 168. This process is also shown in a screenshot in FIG. 9.

Referring next to FIG. 4, the operation of the e-mail template manager module 110 and the e-mail server manager module 112 of FIG. 1, which is shown in greater detail than in the select e-mail template step 136, the customize e-mail step 138, and the select e-mail server step 140 of FIG. 2, is illustrated. The process shown in FIG. 4 begins with a process initiation step 180, and then moves to a choose e-mail template step 182 in which the information technology administrator of the client organization selects a template for a phishing e-mail that will subsequently be sent to employees of the client organization. The phishing scam susceptibility testing system provides a number of available e-mail templates in a use e-mail template database step 184 that can be chosen as a starting point for the phishing e-mail. Alternately, the information technology administrator of the client organization may instead choose to use his/her own template in an upload e-mail template step 186.

Next, the information technology administrator of the client organization will add information including text and potentially graphic images to customize the phishing e-mail in a customize e-mail from template step 188. This process is also shown in a screenshot in FIG. 10. It will be appreciated by those skilled in the art that the customize e-mail from template step 188 provides a higher level of technical control over the phishing e-mails including such features as custom headers and other embellishments. Optionally, a file can be attached to the phishing e-mail in an optionally select enclosure(s) for e-mail step 190. Four exemplary types of attachments are respectively shown in a select PDF enclosure step 192, a select Excel enclosure step 194, a select Word enclosure step 196, and a select PowerPoint enclosure step 198, and other types of enclosures may also be used (e.g., Zip files, etc.). The information technology administrator of the client organization may upload his/her own enclosures. It will be apparent to those skilled in the art that other types of enclosures could be used as well.

After optionally attaching files in the optionally select enclosure(s) for e-mail step 190, the process next moves to an insert probe step 200 in which call-home probe macros are added to the existing attachments. The macros will "call home" to the phishing scam susceptibility testing system if the user opens the attachment and enables macros. The call home probe may be triggered when an attachment is opened with a macro enabled. Other types of links would need to be clicked by a user before they will call home. Excel and other file types support the concept of having "signed" macros (although an "unsigned" macro could also be used). The default settings for these applications may allow signed materials to be run automatically, and most users don't really know what certificates are. The phishing scam susceptibility testing service of the present invention provides attachment probes that can be signed by a certificate authority ("CA"), are self-signed, or are unsigned, collects behavioral information based on these categorizations. It has been determined that while a statistically small percentage (approximately five percent) of individuals open and enable macros on unsigned attachments, the vast majority (approximately ninety percent) open and enable macros on CA-signed attachments.

The process then moves to a select e-mail server step 202 in which the information technology administrator of the client organization selects the e-mail server(s) from which the phishing e-mail will subsequently be sent to employees of the client organization. The phishing scam susceptibility testing system provides a number of available e-mail servers in a select appliance e-mail servers step 204 that can be chosen as the sending server for the phishing e-mail. Alternately, the information technology administrator of the client organization may instead choose to use a public e-mail server (e.g., Gmail from Google, Hotmail from Microsoft, Yahoo!Mail from Yahoo!, etc.) as the sending server for the phishing e-mail in a choose public e-mail server step 206. The phishing scam susceptibility testing service of the present invention is capable of using arbitrary e-mail servers in addition to the e-mail servers contained in the phishing scam susceptibility testing system itself.

The process next moves to a select other options step 208 in which various other options can be selected. For example, the text may be formatted using HTML or left as plain text, objects can be placed into the phishing e-mail, and links for a response can be added to the phishing e-mail. The process of setting up the phishing e-mail(s) then terminates in a process termination step 168. Multiple different phishing e-mails can be set up for a single campaign if desired.

Figure 5:
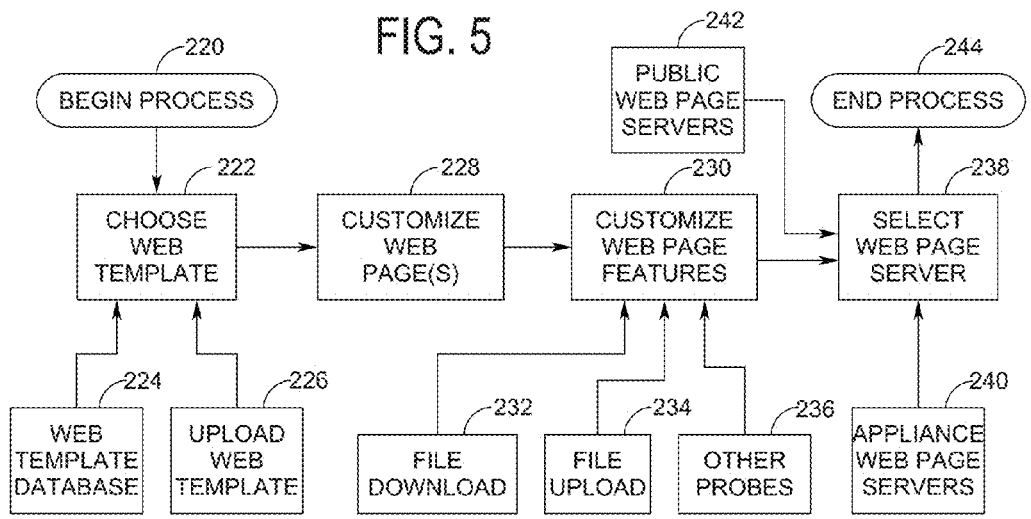
FIG. 5 is a somewhat schematic block diagram showing the operation of the web page template manager and web server manager modules of FIG. 1 to set up the phishing web page the e-mails to be sent to employees of the client organization will point to and to select the servers that will host the phishing web page.

Referring now to FIG. 5, the operation of the web page template manager module 114 and the web server manager module 116 of FIG. 1, which is shown in greater detail than in the customize web page template step 142 and the select web page server step 144 of FIG. 2, is illustrated. The process shown in FIG. 5 begins with a process initiation step 220, and then moves to a choose web template step 222 in which the information technology administrator of the client organization selects a template for a web page that will be reached by selecting a link in the phishing e-mail sent to employees of the client organization. The phishing scam susceptibility testing system provides a number of available web page templates in a use web page template from database step 224 that can be chosen as a starting point for designing the web page that is the target of the link from the phishing e-mail. Alternately, the information technology administrator of the client organization may instead choose to use his/her own web template in an upload web page template step 226.

Figure 11:
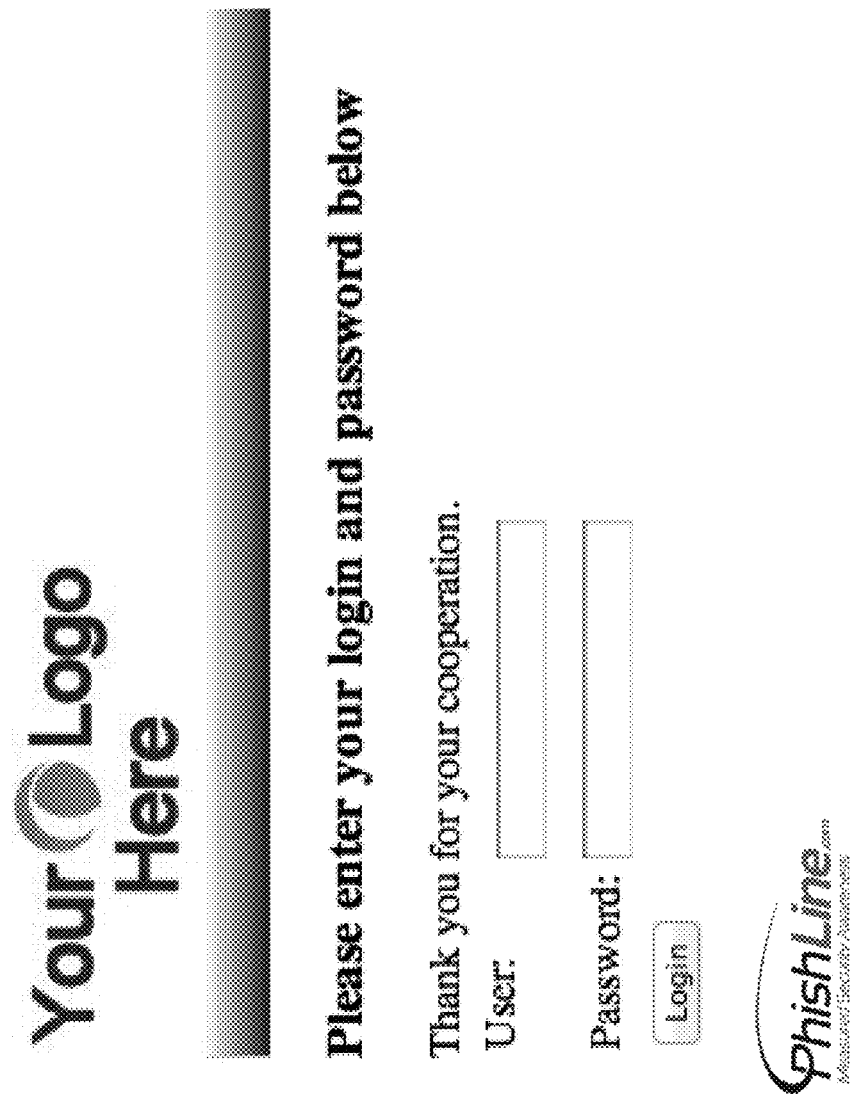
Figure 12:
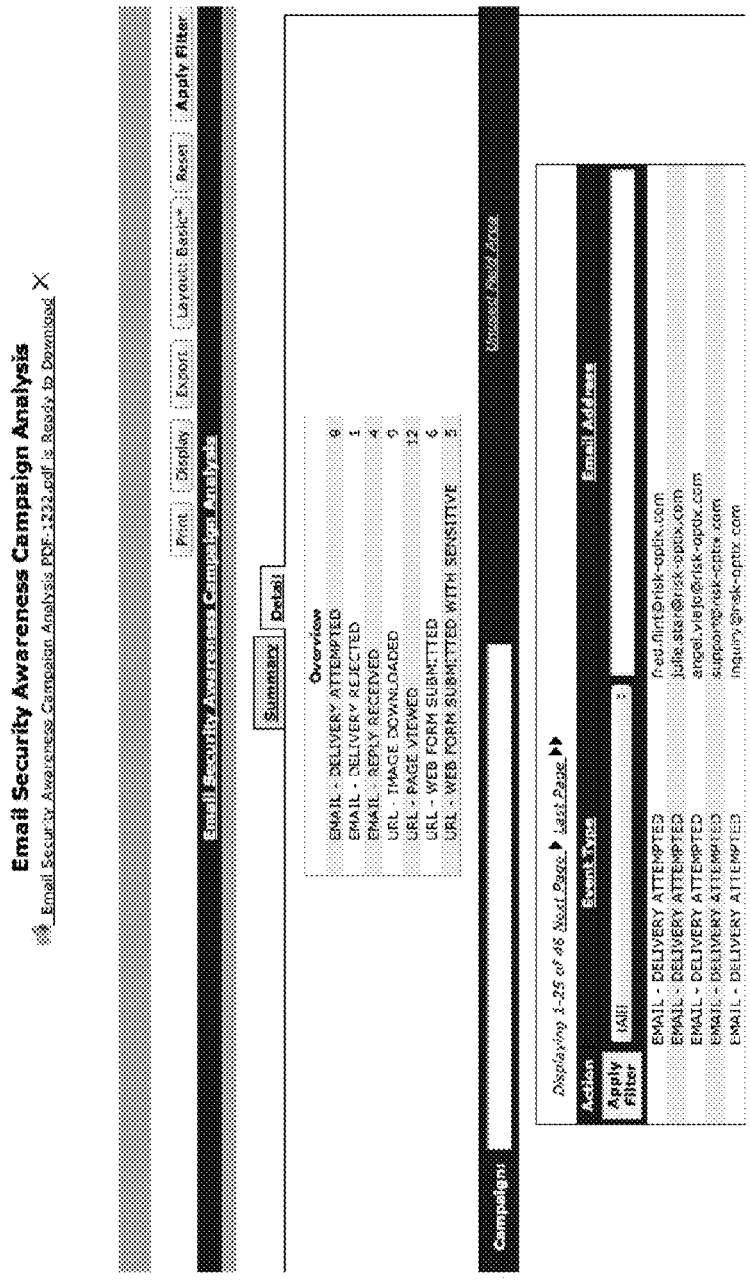
FIG. 12 is a screenshot of a web page showing some results of a phishing e-mail campaign run for the client organization that may be reviewed by the information technology administrators of the client organization.

Next, the information technology administrator of the client organization will add information including text and objects such as graphic images to customize one or more target web page reached by accessing the link from the phishing e-mail in a customize web page(s) from template step 228. This process is also shown in a screenshot in FIG. 11, which shows a web page requesting a user name and a password. The customize web page(s) from template step 228 provides a high level of technical control over the web page(s) design including features typically used in the design of web pages.

The process them moves to a customize web page features step 230 in which the information technology administrator of the client organization can add additional features to the web page which will further probe the susceptibility of the employee of the client organization to additional phishing scams. For example, a file download process initiation step 232 can be added to the web page to prompt individuals accessing the web page to download a file. This can include detection of the web page being accessed by a smartphone upon which the individual accessing the web page may be prompted to download an application (which in the case of an iPhone is referred to an "app").

Another example is that a file upload process initiation step 234 can be added to the web page to prompt individuals accessing the web page to download a particular file. Other types of probes could also be used, and they are collectively included in an initiate other probes step 236. The process then moves to a select web page server step 238 in which the information technology administrator of the client organization selects a web page server(s) which will host the linked web page(s) accessed by individuals clicking on the link in the phishing e-mail.

The phishing scam susceptibility testing system provides a number of available web page servers in a select web page server from library step 240 that can be chosen as the server hosting the target web page. Alternately, the information technology administrator of the client organization may instead choose to use a public web page server (e.g., Gmail from Google, Hotmail from Microsoft, Yahoo!Mail from Yahoo!, etc.) to host the target web page(s) accessed by clicking on the link in the phishing e-mail in a select public web page server step 242. The phishing scam susceptibility testing service of the present invention is capable of using arbitrary web servers in addition to the web servers contained in the phishing scam susceptibility testing system itself. The process of setting up the target web page(s) that will be accessed by clicking on the link contained in the phishing (s) then terminates in a process termination step 244.

Figure 6:
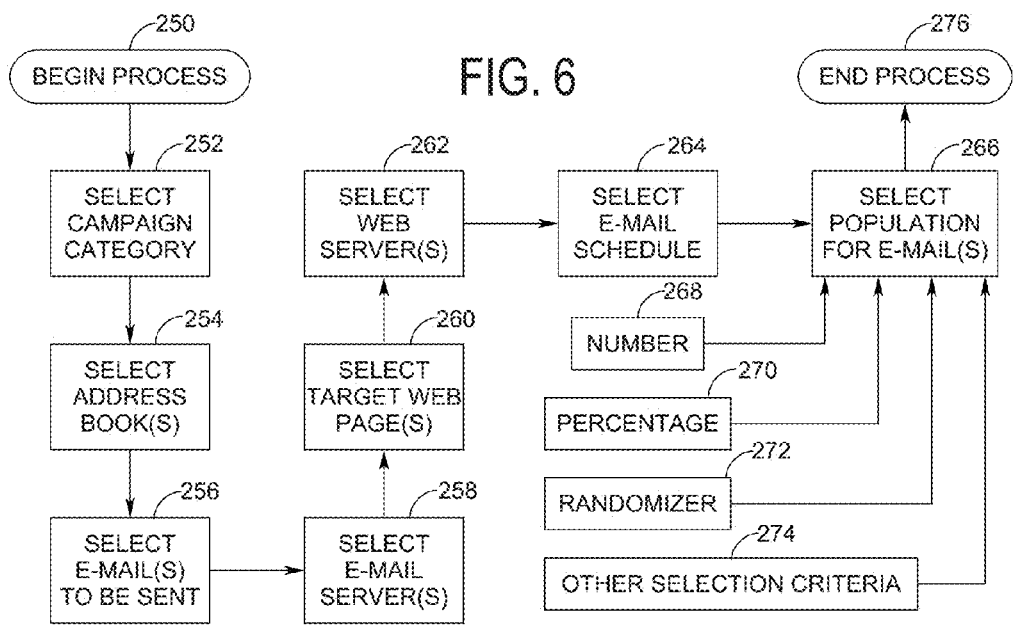
FIG. 6 is a somewhat schematic block diagram showing the operation of the campaign manager module of FIG. 1 to customize and initialize the campaign of phishing e-mails to be sent to employees of the client organization.

Referring next to FIG. 6, the operation of the campaign manager module 118 of FIG. 1, which is shown in greater detail than in the customize campaign step 146 of FIG. 2, is illustrated. The process shown in FIG. 6 begins with a process initiation step 250, and then moves to a select campaign category step 252 in which the information technology administrator of the client organization may optionally use to select a plurality of campaigns simultaneously. A campaign category may be assigned to a plurality of different campaigns as a sorting tool to facilitate simultaneously identifying and operating multiple campaigns simultaneously. The campaign category may also be useful in sorting the results of multiple campaigns.

The process then moves to a select address book(s) step 254 in which the information technology administrator of the client organization selects which address book(s) to associate with the campaign. The address book or books will constitute the entire population of e-mail addresses for the campaign, although not necessarily all of the employees of the client organization identified in the address book(s) will receive an e-mail in the campaign. The process next moves to a select e-mail(s) to be sent step 256 in which the information technology administrator of the client organization selects which of the e-mails that were previously set up will be associated with the campaign. The process then moves to a select e-mail server(s) step 258 in which the information technology administrator of the client organization selects which of the e-mail servers that were previously set up in conjunction with the e-mails will be associated with the campaign.

The process next moves to a select target web page(s) step 260 in which the information technology administrator of the client organization selects which of the web page(s) that were previously set up will be associated with the campaign. The process then moves to a select web server(s) step 262 in which the information technology administrator of the client organization selects which of the web servers that were previously set up in conjunction with the web page(s) will be associated with the campaign.

The process next moves to a select e-mail schedule step 264 in which the information technology administrator of the client organization sets up the duration of the campaign. This will necessarily include a start date, and may optionally include a target or termination date as well. The start date will be the first date upon which the phishing scam susceptibility testing system sends e-mails in the campaign. The target date is a date after no further e-mails will be sent in the campaign.

The process then moves to a select population for e-mails step 266 in which the information technology administrator of the client organization establishes the criteria for the number of phishing e-mails that will be sent out of the entire potential population. A number of options are available for the select population for e-mails step 266, examples of which are included herein. Perhaps most simply, the number of e-mails to be sent can be provided in a select number of e-mails step 268. For example, if the total population of potential e-mail recipients is 1000, by selecting a number less than 1000, less than the entire e-mail recipients will receive the phishing e-mail. If the number is larger than the total population of potential e-mail recipients, each recipient will receive at least one e-mail, and optionally at least some of the potential e-mail recipients could receive more than one e-mail.

If the number of potential e-mail recipients is to be less than the total population of potential e-mail recipients, some criteria may be established to determine which of the potential e-mail recipients will receive the phishing e-mail. While one possibility is to send the phishing e-mail to a selected number of recipients on the list of potential e-mail recipients, another option is to select a percentage of the potential e-mail recipients that will have the phishing e-mail sent to them in a select percentage of recipients step 270. In this event, since less than the total population of potential e-mail recipients is to have the phishing e-mail sent to them, one option is to start at the beginning of the list and send the phishing e-mail to recipients from the top of the list down until the designated percentage has been sent. If there is more than one address book that has been selected, the select percentage of recipients step 270 would be applied to each of the address books in order to determine which recipients would receive the phishing e-mail.

Another option would be to randomly select the recipients of the phishing e-mail in a randomize the selection of recipients step 272. There are other selection criteria that could also be applied to select which of the total population of potential e-mail recipients will have the phishing e-mail sent to them, as exemplified by a use other selection criteria step 274. One such other criteria could be to resend the phishing e-mail to recipients who have previously received the phishing e-mail but have not yet responded. Still another criteria would be to resend the phishing e-mail to prior recipients who have previously responded (demonstrating their susceptibility to phishing e-mails), after sufficient time has lapsed for the client organization to have conducted employee education regarding such issues, to determine whether the client employees in question have learned anything from the employee education or not. Following selection of the population of the phishing e-mails that will be sent, the campaign management process then terminates in a process termination step 276.

Figure 7:
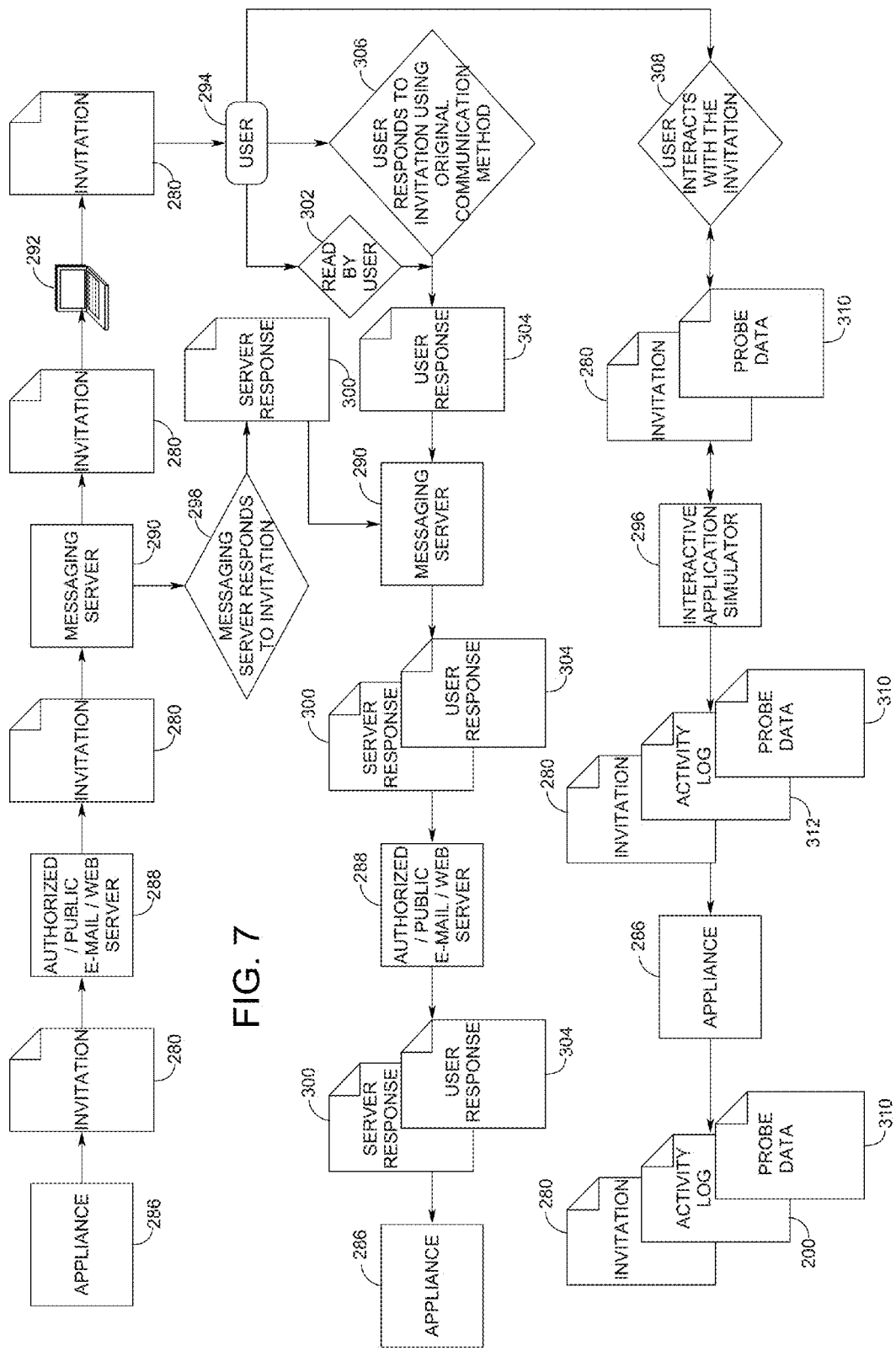
FIG. 7 is a flowchart schematically illustrating the operation of the phishing scam susceptibility testing system of the present invention illustrated in FIG. 1 as it sends an e-mail invitation to a user who is an employee of the client organization and receives various responses in return.

Referring now to FIG. 7, the operation of the message generator module 96, the authorized e-mail/web servers 92, the message monitoring module 98, and the incident response testing module 100 of FIG. 1, which is shown in greater detail than in the execute campaign step 148 of FIG. 2, is illustrated. The process shown in FIG. 7 is in the form of a flowchart having apparatus, but schematically illustrating the flow of information between the various apparatus elements shown. There are three levels of communication shown in FIG. 7, which are respectively located on the top, the middle, and the bottom of FIG. 7. These three levels of communication are the sending of the phishing e-mail, referred in FIG. 7 as an invitation 280, which is shown on the top level of FIG. 7, an e-mail sent by the client employee in response to the phishing e-mail, referred to on FIG. 7 as a user response 282, which is shown on the middle level of FIG. 7, and an interactive response to the phishing e-mail, referred to in FIG. 7 as probe data 284, which is shown on the bottom level of FIG. 7.

The apparatus illustrated in FIG. 7 includes an appliance 286 which embodies much of the phishing scam susceptibility testing system of the present invention, an authorized/public e-mail/web server 288 which may represent either or both of the authorized e-mail/web servers 92 and the public e-mail/web servers 54 shown in FIG. 1, a messaging server 290 which may represent the client messaging server 60 of FIG. 1, a laptop computer 292 that is used by a user 294 to access e-mail and the Internet, and an interactive application simulator 296 which represents the message generator module 96, the message monitoring module 98, and the incident response testing module 100 of the appliance 40 of FIG. 1 as well as the processor unit 88 and the program database 104 of the appliance 40.

Referring to the top level of FIG. 7, the process that is illustrated in FIG. 7 begins when the appliance 286 generates the invitation 280 (the phishing e-mail) and sends it via the authorized/public e-mail/web server 288, which relays the invitation 280 to the messaging server 290. The authorized/public e-mail/web server 288 may also include a series of multiple public e-mail servers. Depending upon the configuration of the messaging server 290, it may automatically provide a "delivered to e-mail server" message in a messaging server responds to invitation step 298, thereby generating a server response 300. The server response 300 is generated in the customize web page(s) from template step 228, which relays it via the authorized/public e-mail/web server 288 to the appliance 286, with the relaying of the server response 300 back to the appliance 286 occurring in the middle level of FIG. 7.

Another type of automated response that can occur is if the phishing e-mail constituting the invitation requested a "read" confirmation. In this case, when the user 294 reads the invitation 280, and does not object to sending a "read" confirmation, the "read" confirmation will be generated in a read by user step 302 which has as an output a first type of user response 304. This user response 304 is sent by the messaging server 290 to the appliance 286 via the authorized/public e-mail/web server 288. If, in response to viewing the invitation 280, the user 294 sends an e-mail response, a second type of the user response 304 will be generated in a user responds to invitation using original communication method step 306. This user response 304 is also sent by the messaging server 290 to the appliance 286 via the authorized/public e-mail/web server 288.

Referring now to the bottom level of FIG. 7, if the user 294 accepts the invitation 280 by interacting with it (e.g., clicking on a link, etc.) in a user interacts with the invitation step 308, probe data 310 will be generated. Both the probe data 310 and the invitation 280 are provided to the interactive application simulator 296, which also generates an activity log 312 detailing all interactions of the user 294 with the interactive application simulator 296. The invitation 280, the probe data 310, and 312 are all provided by the interactive application simulator 296 to the appliance 286. While not shown in the bottom level of FIG. 7 for clarity, one skilled in the art will readily understand that the messaging server 290 and the authorized/public e-mail/web server 288 are used to facilitate this flow of information from the user 294 and his/her laptop computer 292 to the appliance 286. Thus, the appliance 286 receives all of the information referenced herein with respect to FIG. 7 and will subsequently analyze it.

The interactive application simulator 296 is used to provide advanced technical vulnerability testing, similar to what a penetration tester of attacker would do using the advanced probing techniques of the phishing scam susceptibility testing service of the present invention. If desired, statistical sampling techniques may be used to perform tests on less than all of the users 294, rather than simply probing every user 294. The interactions can be either active or passive interactions. For example, the phishing scam susceptibility testing service of the present invention can identify "active" interactions, such as a user at a client organization clicking on a link embedded in an Adobe Acrobat document (.PDF), as well as "passive" interactions, such as when a user at a client organization opens an attachment probe that automatically "calls home" once macros were enabled. The "call home" feature can also collect advanced technical vulnerability information, such as the version of Excel that is being used on the computer of the user at the client organization.

While the example of the phishing scam susceptibility testing service of the present invention provided in FIG. 7 is provided with respect to a laptop computer that is presumably located at a client organization facility, those skilled in the art will realize that it is equally applicable to a desktop computer, a tablet computer, or a smartphone connected either directly of via Wi-Fi to the network, whether at the client organization facility or at the home of an employee of the client organization. It is also applicable to a smartphone connected via a cellular network, and mobile applications can be tailored to smartphones. For example, the phishing scam susceptibility testing system can send an SMS message to a smartphone user, and if the smartphone user clicks on a link contained therein, it can offer to install a mobile app that is in reality an attachment probe.

The e-mail address system allows for an arbitrary number of extended attributes, including such information as Twitter ID or, for a smartphone, other information such as the mobile telephone number. Other attributes may be obtainable from an e-mail address system, such as the employee's title, division, pay grade, or any of a number of other attributes that could be used to select, track, and report on campaign activities.

With respect to GPS information, the phishing scam susceptibility testing system has the ability to enable a feature to collect GPS information using standard application program interfaces ("API's"). Since collecting longitude, latitude, altitude, and speed may be considered to be personal information, the phishing scam susceptibility testing system is desirably configured to collect only the accuracy reading. In this instance, for example, a cell phone may report that it is accurate to twenty meters, in which case that would be the only information that would be collected.

Still referring to FIG. 7, the preferred handling by the interactive application simulator 296 of sensitive information will be briefly discussed. If a user enters sensitive information, the phishing scam susceptibility testing system will take reasonable steps to not actually collect the information since doing so could be a liability. At the client side (the browser, the app, a Microsoft Excel/Microsoft Word/Adobe Acrobat reader), the phishing scam susceptibility testing system will attempt to take a cryptographic hash of sensitive information (such as an MD5 or SHA1 or similar hash). For example, if the user is entering a password on a web form, the probe and the interactive application simulator 296 will instruct the user's browser to hash the password and remove or discard what was typed before sending it to the interactive application simulator 296 and the appliance 286. This is critically important, since many tests include web servers that are not encrypted "http" as opposed to the encrypted "https" (the "s" stands for secure). By hashing and removing the password, the phishing scam susceptibility testing system reduces the chances that the requested sensitive information will be intercepted by a real attacker.

At the client side, the phishing scam susceptibility testing system will attempt to profile the information that was entered rather than collecting the actual information. For example, if a user enters a password, the probe and the interactive application simulator 296 can be configured to collect the number of characters entered. If client-side encryption is not enabled, the phishing scam susceptibility testing system can be configured to provide a customizable clear warning to the user. For example, the login page may default to show a warning that the user should not actually enter a password since the website is http instead of https. If JavaScript is enabled, the system will remove the message in anticipation of the capability to hash or profile.

On the server side, if for some reason the user ignored warnings, the interactive application simulator 296 will perform the hashing and profiling and discarding of the sensitive information. For example, if a user uploads a file using the web form, the interactive application simulator 296 will calculate one or more hashes and then profile the file name, size, type, etc. The interactive application simulator 296 will immediately delete the actual contents of the file. This is irrespective of the client side capabilities.

Additionally, the user activity and technical probe data is encrypted by the interactive application simulator 296. This is a critical and novel step that prevents anyone from accessing the data by directly reading the probe logs. (However, this does not prevent review of standard web logs, or prevent someone from tampering with the published web page template, but it is a novel part of the phishing scam susceptibility testing system.) These approaches may also be applied to other sensitive data. Such data could be hashed, profiles, and the data that is actually collected as appropriate. The data actually collected is also preferably encrypted in the interactive application simulator 296 so that when it is transmitted to the appliance 286 it is done safely.

Referring next to FIG. 8, the operation of the report generator 102 of FIG. 1, which is shown in greater detail than in the analyze results step 150 of FIG. 2, is illustrated. A small portion of this process is also shown in a screenshot in FIG. 2, which shows a summary page providing some of the results of the campaign in summary fashion. It will be appreciated by those skilled in the art that integration of the phishing scam susceptibility testing system with incident response modules provides enterprise-quality tracking of both the results of the test, and enables information technology administrators to assess what would have been the "collateral damage" had the phishing scam susceptibility testing service of the present invention been an actual phishing scam targeted at the client organization. The phishing scam susceptibility testing service of the present invention also contemplates benchmarking of the results across industries, which may be accomplished by comparing results with those of other client organizations without the disclosure of any confidential information. This includes profiling the types of attacks and the results at a detailed level, with the results being provided in a plurality of formats for review by the information technology administrators of client organization.

The process shown in FIG. 8 begins with a process initiation step 320, and then moves to one of four different analyses providing detailed information on a campaign, the four analyses being a CVSS analysis 322, an outbound analysis 324, an inbound analysis 326, and a web activity analysis 328. The CVSS analysis 322 is used as one of the analyses since many of the information technology administrators are accustomed to this universal open and standardized method for rating IT vulnerabilities (the "Common Vulnerability Scoring System"). In the CVSS analysis 322, the National Vulnerability Database ("NVD") may be used to provide CVSS scores for almost all known vulnerabilities. Those skilled in the art will appreciate that other analyses and databases could be used instead, including various vendor databases. Following the performance of the CVSS analysis 322 (or any of the other three analyses), the process moves to a process termination step 330.

As an example of CVSS and vulnerability reporting, the following illustrative example is provided. On January 1, three users, each of whom was running Adobe Flash 10.0.1, clicked on a link. On January 1, there was one medium vulnerability known in Flash 10.0.1. On January 10, there were three new high-risk vulnerabilities found in Flash 10.0.1. Thus, it was not known on January 1 that there were high-risk vulnerabilities, but given the time that it typically takes for CVSS or other databases to be updated, it may be desirable to analyze various exposure windows. For example, all vulnerabilities that existed within ten days after a user clicked on a link may be considered. A novel aspect of the phishing scam susceptibility testing system is that it can perform its analysis based upon such time windows. Reporting used by the phishing scam susceptibility testing service of the present invention allows for filtering and grouping by standard attributes, such as the low, medium, and high levels of exposure, CVSS score, whether it is known to be remotely exploitable, are there patches available, etc.

The outbound analysis 324 begins with the performance of an outbound analysis step 332, which determines the state of outbound phishing e-mails, which may be in one of four states: 1. Queued, meaning that the phishing e-mail is scheduled for future delivery sometime after a selected start time; 2. Sending, meaning that the phishing e-mail is currently being processed for eminent delivery; 3. Sent, meaning that the phishing e-mail has been sent to the e-mail servers for delivery; and 4. Late, meaning that the e-mail processor has not yet selected the phishing e-mail for delivery even though the start time has passed. Next, in a check for bounced status step 334, the phishing e-mail is checked to see if a response has been received indicating that the phishing e-mail was undeliverable.

The next step is a check for out-of-office indicator step 336 in which the phishing e-mail is checked to see if an "out-of-office" was received in response to the e-mail. One possible use of out-of-office responses is that a list of people who are out of the office could be created and put into a calendar. Such a calendar could be used to easily represent the data that would be available to real attackers for educational purposes, illustrating, for example, how a hacker could use the data to attack an employee's home if the out-of-office responses indicate that the employee is on vacation. The calendar could also show the number of people who are known to be out-of-office every day, broken down by department or other attributes such as address book extended attributes (for example, on Monday, July 1, there are ten executives in such-and-such a division who are out of the office.) Following that step, the next step is a check for reply received step 338 in which the phishing scam susceptibility testing system checks to see if an e-mail replying to the sent phishing e-mail has been received. The outbound analysis 324 then terminates in the process termination step 330.

The inbound analysis 326 begins with the performance of an inbox analysis step 340, which performs some basic analyses of inbound e-mail responsive to phishing e-mails, including, for example, the IP address used, host name, organization, country, latitude and longitude, registered agent, the e-mail address of the responding e-mail, the size of the responding e-mail, etc. Technical probes of browser version, plug-in versions, etc. may be done by the phishing scam susceptibility testing system of the present invention in two ways: 1. a passive way wherein the standard protocol header information, such as http or smtp, is collected; and 2. an active way in which code actively queries the client environment to identify versions of browsers, plug-ins, and capabilities, such as whether java, activeX, and cookies are enabled in the browser.

Next, in a check for message time stamp step 342 the responding e-mail is checked for its time stamp. The responding e-mail is then checked for an indicator that the phishing e-mail has bounced in a check for bounce notice step 344. Finally, the responding e-mail is checked for an indicator that the recipient is out of the office in a check for out-of-office notice step 346, following which the inbound analysis 326 terminates in the process termination step 330.

Most of the detailed analysis of the responses to phishing e-mails is done in the web activity analysis 328, which begins with the performance of a web activity analysis step 348 which shows the number of web activities, or "hits," that were each caused by the user having one access to a web page resource by a browser or e-mail client responding to the phishing e-mail. In a check for call home step 350, once the recipient of a phishing e-mail has viewed a web page, it will periodically "call home" to let the phishing scam susceptibility testing system know that the recipient still has the browser open to the web page, typically one to two times per minute. Next in a check for page view step 352, the phishing scam susceptibility testing system shows the ratio (or, alternately, the number) of hits that were caused by the recipient of the phishing e-mail opening a web page or submitting a web form.

After that, the process moves to a check for image view step 354, the phishing scam susceptibility testing system shows the ratio (or, alternately, the number) of hits that were caused by a recipient of the phishing e-mail requesting an individual image. Each time the recipient chooses to "show images" in an e-mail client, each image displayed represents one hit, and if the recipient views a page in a browser, each image included on the page is also a hit. Next, in a check for file download step 356, the phishing scam susceptibility testing system shows the ratio (or, alternately, the number) of hits that were caused by a recipient of the phishing e-mail requesting a file (which the information technology administrators of the client organization had previously uploaded to the appliance 40 (FIG. 1) or the appliance 286 (FIG. 7)) from a file download page. Following that step, in a check for login form step 358, the phishing scam susceptibility testing system shows the ratio (or, alternately, the number) of hits that were caused by the recipient of the phishing e-mail submitting a login form.

After that step, in a check for login authorization step 360, the phishing scam susceptibility testing system shows the ratio (or, alternately, the number) of hits that were caused by the recipient of the phishing e-mail submitting a login form. Next, in a check for login for user step 362, the phishing scam susceptibility testing system shows the ratio (or, alternately, the number) of hits that were caused by the recipient of the phishing e-mail submitting a non-blank user name on a login form. Following that step, in a check for form field password step 364, the phishing scam susceptibility testing system shows the ratio (or, alternately, the number) of hits that were caused by the recipient of the phishing e-mail submitting a non-blank password on a login form.

After that step, in a check for feedback form step 366, the phishing scam susceptibility testing system shows the ratio (or, alternately, the number) of hits that were caused by the recipient of the phishing e-mail submitting a feedback form. Next, in a check for file upload step 368, the phishing scam susceptibility testing system shows the ratio (or, alternately, the number) of hits that were caused by the recipient of the phishing e-mail submitting a file for upload on a web form. In this instance, the user may be prompted to submit one or more files on a web "file upload form." For example, the user may receive an e-mail purporting to be from the accounting department and requesting the user to upload his/her budget or sales forecast spreadsheet. If the user does so, the interactive application simulator 296 would hash, profile, and discard the uploaded file, while including the activity and probe information in the detailed analysis.

A "Captcha" is a type of challenge-response test used in computing as an attempt to ensure that the response is generated by a person. The response can be as simple as checking a box, but more typically requires the user to type letters or digits from a distorted image that appears on the screen. In a check for action Captcha step 370, the phishing scam susceptibility testing system shows the ratio (or, alternately, the number) of hits that were caused by the recipient of the phishing e-mail viewing a web page containing an action captcha request. Next, in an action Captcha authorized step 372, the phishing scam susceptibility testing system shows the ratio (or, alternately, the number) of hits that were caused by the recipient of the phishing e-mail submitting a value in a Captcha form field.

Following the performance of all of the various steps in the web activity analysis 328, the information is organized for presentation to information technology administrators of the client organization in a format report step 374. The web activity analysis 328 terminates in the process termination step 330. It will be appreciated by those skilled in the art that the results of the web activity analysis 328 are particularly amenable to presentation in graphical or pie chart format.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system configured to facilitate assessment by an information technology administrator of the potential susceptibility of employees of an organization to phishing scams, the system comprising:
   a first module configured to generate an invitation;
   a second module configured to receive a contact information for a plurality of employees from the administrator;
   a third module configured to send the invitation to the plurality of the employees; and
   a fourth module configured to monitor interaction with the invitation by the employees, wherein the monitored interaction includes responses provided by recipients of the invitation and data obtained in response to the invitation, create a log based on the invitation and the monitored interaction of the employees with the invitation, encrypt the log, and provide the log to the administrator.

2. The system of claim 1, wherein the fourth module is configured to receive probe data generated by each employee's interaction with the invitation, and wherein the fourth module is configured to provide the probe data and the invitation to the administrator.

3. The system of claim 2, wherein the system is configured to provide benchmark information to the administrator based on the monitored interaction of the employees with the invitation.

4. The system of claim 2, wherein the system is configured to provide comparison information to the administrator between the monitored interactions of the employees with the invitation and a previous e-mail campaign.

5. The system of claim 1, wherein the fourth module is configured to analyze the risk level of each employee's interaction with the invitation based on a predetermined time period subsequent to each interaction.

6. The system of claim 5, wherein the fourth module is configured to instruct the employees' web browser to determine at least one characteristic of the input received from each of the employees, to delete the input received from each of the employees, and to send information regarding the at least one characteristic for each of the employees' input to the fourth module.

7. The system of claim 6, wherein the at least one characteristic includes information regarding the number of characters of the input received from each of the employees.

8. The system of claim 6, wherein the at least one characteristic includes a hash of the input received from each of the employees.

9. The system of claim 1, wherein the invitation is an e-mail including a link to a web page configured to be accessed by the employees using a web browser by clicking the link;
wherein the web page includes a portion configured to receive input from the employees; and
wherein the fourth module is configured to instruct the employees' web browser to determine whether each of the employees provides input to the web page.

10. The system of claim 1, wherein the invitation is an e-mail including a link to a web page configured to be accessed by the employees using a web browser by clicking the link;
wherein the web page includes a portion configured to receive input from the employees; and
wherein the fourth module is configured to instruct the employees' web browser to profile the input received from each of the employees before sending it to the fourth module.

11. The system of claim 10, wherein the web page is configured to prompt the employees to upload a file; and
wherein the fourth module is configured to direct the web page to profile at least one of the name of the file, the size of the file, and the type of the file, before transmitting information regarding the file to the fourth module.

12. The system of claim 1, wherein the fourth module is configured to instruct the employee's web browser to encrypt information sent from the employee's web browser to the fourth module.

13. The system of claim 1, wherein the invitation is an e-mail including a link to a web page configured to be accessed by the employees using a web browser by clicking the link;
wherein the webpage includes a portion configured to receive input from the employees; and
wherein the fourth module is configured to instruct the employees' web browser to profile the input received from each of the employees with a one way hash and before sending the input to the fourth module.

14. The system of claim 1, wherein the invitation is an e-mail including a link to a web page configured to be accessed by the employees using a web browser by clicking the link;
wherein the webpage includes a portion configured to receive input from the employees; and
wherein the fourth module is configured to instruct the web browser to profile the input received from each of the employees and to delete the input received from each of the employees.

15. The system of claim 1, wherein the invitation is an SMS message including a link which if clicked by one of the employees is configured to install an attachment probe on the one of the employees' device.

16. The system of claim 1, wherein for each monitored interaction with the invitation by an employee the system is configured to determine information regarding that employee's computer.

17. The system of claim 16, wherein the determined information regarding that employee's computer includes at least one of the version of Excel that is being used on that employee's computer, the version of the web browser being used on that employee's computer, the plug-ins being used on that employee's computer, and whether java, activeX, or cookies are enabled in the web browser being used on that employee's computer.

18. The system of claim 1, wherein the fourth module is configured to avoid collecting potentially confidential information provided by the employees.

* * * * *